United States Patent Office 3,654,231
Patented Apr. 4, 1972

3,654,231
MANUFACTURE OF EXTRUDED SUPER-POLYESTER PRODUCTS
Carl T. Brozek, Rochester, N.Y., assignor to Eastman Kodak Company, Rochester, N.Y.
Filed June 29, 1970, Ser. No. 50,768
Int. Cl. C08g 17/003
U.S. Cl. 260—75 M   6 Claims

ABSTRACT OF THE DISCLOSURE

In a process for polymerizing and extruding polyester film or other products comprising the steps of:
 (a) in a prepolymer build-up step performed in a separate apparatus, polymerizing prepolymer to a polymer having a product inherent viscosity above about 0.7; and
 (b) extruding the polymer to finished form;
the present invention provides the improvement which comprises eliminating the separate, polymer build-up step in a separate apparatus by (1) introducing a polyfunctional polyol cross-linking agent into the prepolymer, and (2) providing a mechanical energy input of from about 15 to about 150 ft./lbs./sec. per pound of the polyester material in the mixing stage of the extrusion apparatus thereby permitting polymer formation and attainment of product inherent viscosity in a single and continuous extrusion step with very little, if any, adverse affect on the tensile or other physical properties of the extruded material. Otherwise, conventional extrusion conditions including time and temperature are used to accomplish polymerization and extrusion in a single continuous operation without the need for a separate and distinct polymer build-up step for purposes of attaining product inherent viscosity prior to extrusion.

FIELD OF THE INVENTION

The present invention relates to an improved process for the production of extruded polyester materials and in particular to a process for preparing such materials wherein (a) polymerization of the polyester and preferably poly(ethylene terephthalate) prepolymer to product inherent viscosity and (b) the extrusion of the polymer into sheet or other form are incorporated into a single continuous extrusion step. The resulting process is markedly shorter in time and requires significantly less capital equipment and manpower as compared to conventional polyester processes which require the initial preparation of a powdered prepolymer product.

PRIOR ART

In the prior art, the preparation of poly(ethylene terephthalate), hereinafter PET, sheet suitable for photographic film and other conventional applications, and in some cases even molding applications, was generally formed using a three step polymer synthesizing process and completed by extruding the polymerized material into the desired sheet or other form. Thus, the "monomer" was conventionally produced by either ester interchange or ester exchange, by interchanging ethylene glycol and a suitable molten lower dialkyl ester of terephthalic acid to form the bis(2-hydroxyethyl) terephthalate monomer or by transesterification of a lower dialkyl ester of terephthalic acid with some suitable ester of ethylene glycol. The "monomer" [bis(2-hydroxyethyl)terephthalate] was then polymerized to a prepolymer, usually by melt condensation, and finally the prepolymer powdered and polymerized to a polymer having product inherent viscosity by fluidized powder or some other suitable polymerization technique prior to the material being charged into an extruder and subsequently extruded into sheet or some other suitable and desired form.

Although this method of preparation produced very satisfactory, and, under some conditions, highly superior materials, it did, however, require considerable amounts of time and separate reaction and extrusion vessels to accomplish complete formation of the extruded polyester film, due to the requirement for separate and distinct polymer "build-up" polymerization and product polymer extrusion steps. For example when prepolymer build-up was accomplished using a "powder build-up" as described more fully below, build-up times in excess of 15 hours and very high capital expenditures were not uncommon.

It is therefore an object of the present invention to provide an improved process for the formation of extruded PET and other polyester films or extruded materials which reduces the number of operations and consequently the amount of time, equipment and manpower required for the formation of such products.

DESCRIPTION OF THE DRAWINGS

Other objects and advantages of the present invention will be made obvious to those skilled in the art when the following description is considered in relation to the accompanying drawing of which:

FIG. I shows a graph of mixing time versus melt viscosity for prepolymer materials of the type synthesized and utilized in the formation of PET extruded films and other materials treated in accordance with the method of the present invention at varied mixing speeds; and FIG. II shows further modifications which may be achieved in the rates of product inherent viscosity attainment when varying amounts of the cross-linking agents of the present invention are added to the prepolymer and the requisite amount of mechanical energy imparted thereto.

DETAILED DESCRIPTION OF THE INVENTION

Figure 1:
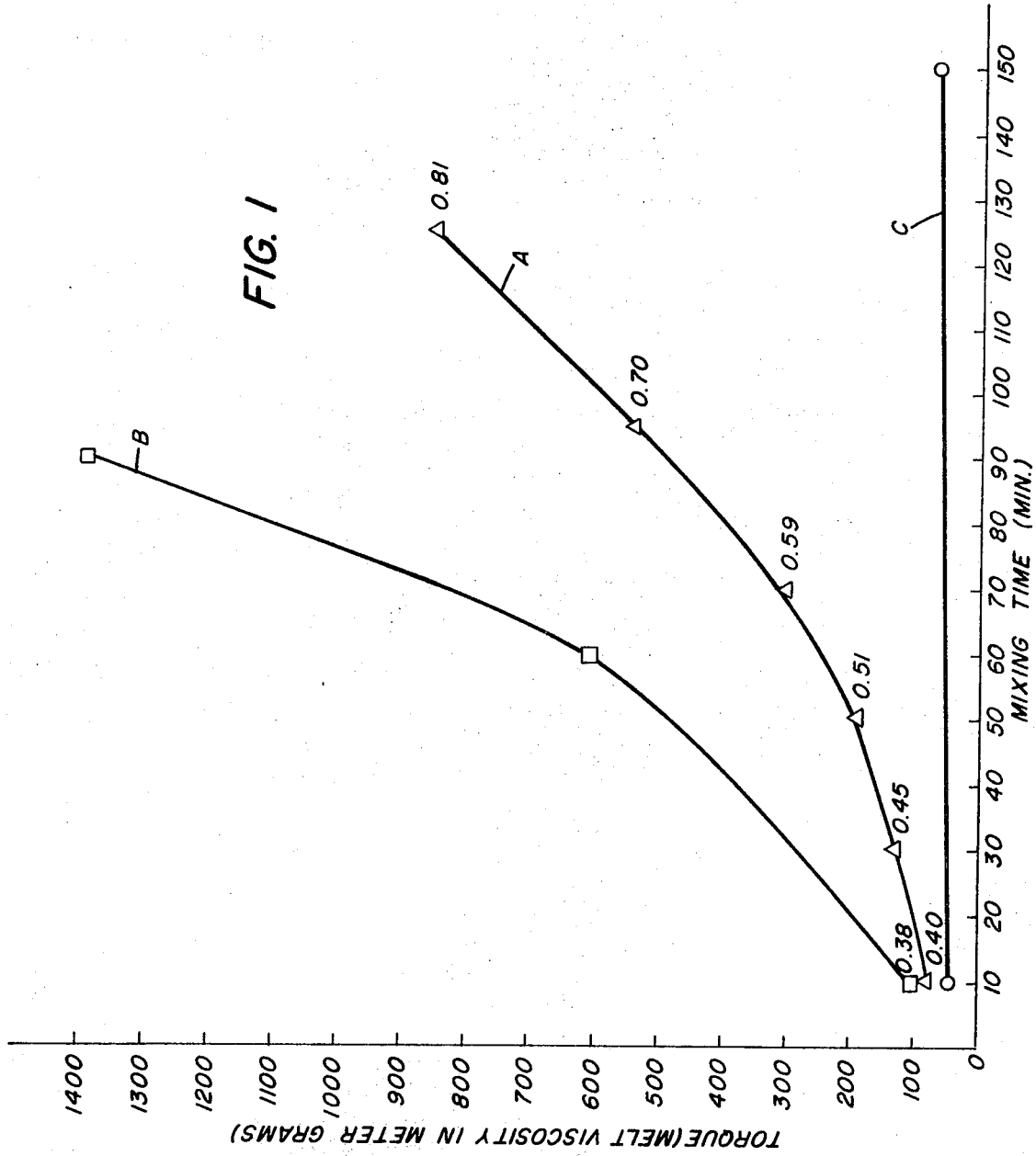
Figure 2:
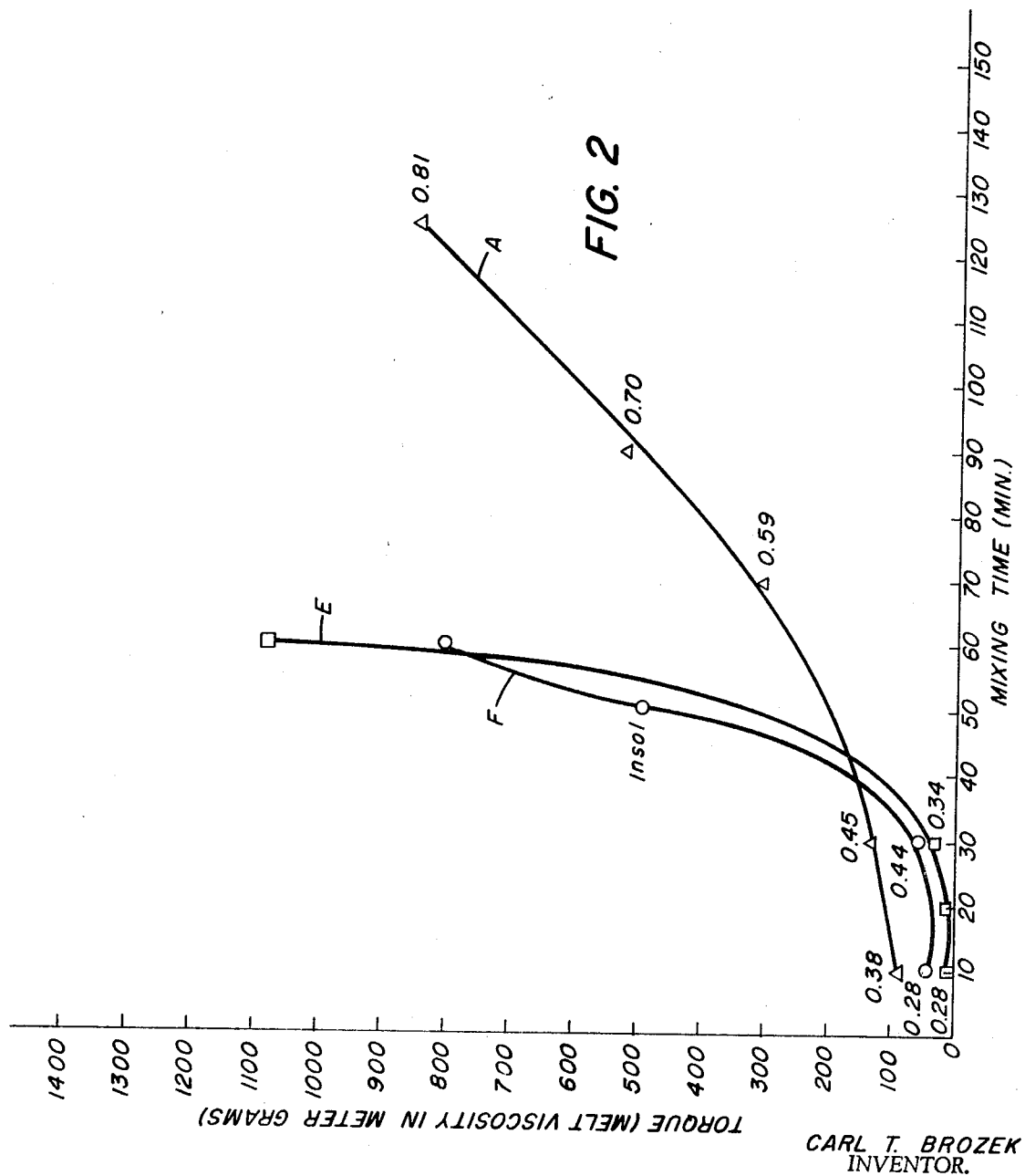

The addition of polyfunctional polyol cross-linking agents or chain extending agents to PET or other polyester materials in the course of the synthesis thereof is not new. This technique has been used for a number of years to counter the effects of adding chain terminating agents, for example, methoxypolyethylene glycol which can be polymerized with a saturated alkylene glycol and an aromatic dicarboxylic acid to produce fiber forming polyesters having increased dye affinity. As explained in U.S. Pat. No. 3,241,926 to Parker et al., it is known that when such chain terminating agents are used in the formation of polyesters having improved dye affinity, and that one can further enhance the tensile and other physical properties of the modified polyester product by incorporating a small but significant amount of a chain branching or cross-linking agent, for example, pentaerythritol, in the ester interchange reaction mixture with the initial charge of ester interchange reagents. The chain branching agent allows the introduction into the polyester molecule of the necessary amount of chain terminator to produce improved dye affinity without the reduction in molecular weight and hence product inherent viscosity encountered when like amounts of chain terminators are employed in the ester interchange reaction mixture without the simultaneous addition of the chain branching agents.

It has now been discovered that the introduction of these same cross-linking or branching agents in small concentrations on the order of from about 2,000 to about 20,000 parts per million of the ester into the polyester molecule at a *later stage* in the preparation of polyester materials suitable for extrusion, namely after prepolymer formation and just before extrusion, when accompanied by a concurrent input of mechanical energy ranging from about 15 to about 150 ft.-lbs./sec. per pound of polyester, permits elimination of the conventional separate and distinct prepolymer polymerization step performed at a location away from the extruder in polyester materials to which no chain terminators have been added, and permits a single continuous prepolymer polymerization and extrusion step to be performed in the extruder under conventional extrusion conditions. This effect is particularly surprising, since under such extrusion conditions polyester prepolymer materials will generally actually undergo a decrease in inherent viscosity or alternatively remain at the same inherent viscosity.

More specifically, it has now been discovered that when a polyfunctional polyol, for example, glycerol or pentaerythritol is added to the polyester prepolymer produced in any conventional fashion, and the mixture placed in a Brabender Plasti-Corder to simulate dwell time in the mixing stage of an extruder conventional extrusion conditions, with the exception that certain controlled amounts of mechanical energy are imparted to the polyester mixture, the inherent viscosity, as measured in terms of melt viscosity, steadily increases as a function of time as shown in the drawings and explained more fully below. This, as opposed to the behavior exhibited by the "unmodified" PET prepolymer, which, as also shown in the drawing and explained more fully below, fails to undergo any significant increase in inherent viscosity under conditions approximating those experienced under normal extrusion conditions and the case of some other polyesters which actually undergo a decrease in inherent viscosity during dwell times in the extruder.

One of the processes in which the practice of the method of the present invention has been found successful, is the conventional polyester synthesis which comprises the steps of: (1) forming the polyester monomer; (2) polymerizing the monomer to prepolymer inherent viscosity; (3) polymerizing the prepolymer to polymer having product inherent viscosity using what is known as a "powder build-up" processes; and (4) extruding the polymer to finished form. According to the present invention, formation of the monomer is performed using any conventional ester exchange or ester interchange process, any number of which are well known in the art and widely used. For example, the bis(2-hydroxyethyl) terephthalate monomer can be formed in accordance with the continuous process described in U.S. Pat. No. 3,167,531 to Parker et al. wherein a molten lower dialkyl ester of terephthalic acid, such as dimethyl terephthalate, and a molecular excess of ethylene glycol are brought into reacting contact in the presence of a catalytic amount of an ester interchange catalyst, for example, zinc acetylacetonate, or zinc acetate, under ester interchanging conditions, as explained in detail in the above patent.

Alternatively, ethylene glycol and dimethyl terephthalate or some other suitable lower dialkyl terephthalate can be mixed together and heated at atmospheric pressure in the presence or absence of a suitable esterification catalyst, as desired, to form the monomer, and methanol or, depending upon the dialkyl ester used, some other lower alkyl alcohol, removed by distillation. Among the catalysts which can be used in this type of process are any of the well known esterification catalysts such as: p-toluene-sulfonic acid; camphorsulfonic acid; cobaltous acetate; zinc succinate, antimony oxide and the like. However, it may be preferred to employ manganous formate as a catalyst since it apparently enables the production of a higher inherent viscosity more rapidly during the formation of the prepolymer and subsequently in polymerization of the prepolymer.

Polymerization of the monomer to prepolymer is generally achieved by heating the monomer at a temperature of from about 200° C. to about 300° C. or at just about the melting point of the monomer for a period of from about 1 to about 5 hours. This procedure is conventionally carried out under what are known as melt condensation polymerization conditions, a technique which is well known in the art and whose details, since they play no significant role in the outcome of the inventive process of the instant invention require no further description at this stage.

It is at this point in the conventional polyester film preparation, the prepolymer having been formed, that the discovery of the present invention permits the elimination of the third step thereof, and permits the achievement of product inherent viscosity at the prepolymer stage during and in the course of conventional extrusion practice.

The prepolymer could also be derived from polyester scrap which was a byproduct of film or article casting or extrusion processor. For example, the polyester scrap generally identified as "edge cuttings" which is a by-product of photographic film base manufacture and which may be easily converted to prepolymer by melting in a recovery process is also a candidate for treatment in accordance with the method of this invention to render it suitable for re-use in the manufacture of either film base or other extruded articles.

The method of this invention offers particular advantage in processes which conventionally utilize a powder build-up process to convert prepolymer which has been formed by one process or another and then powdered and dried. According to these processes the powdered prepolymer is heated at a temperature of from about 180 to about 230° C. in a fluidized bed under a nitrogen atmosphere for a period of time sufficient to have raised the inherent viscosity of the prepolymer powder as measured in phenol: chlorobenzene (60:40) from a level of, for example, about 0.38 to a polymer inherent viscosity level in the vicinity of 0.7 or above. As already briefly mentioned, such a powder build-up process must be carried out in an apparatus which is separate from both the vessel in which the monomer and prepolymer are formed and that in which the extrusion is performed. Such an apparatus generally requires a capital outlay on the order of 50–100 thousand dollars and performs the required build-up of inherent viscosity from about 0.38 to about 0.7 over a period of from about 15 up to about 20 hours thus making this operation one of the most time consuming and therefore expensive of the entire process.

In the successful practice of the present invention, a small amount, from about 2,000 to about 20,000 parts per million and preferably from about 4500 to about 10,000 parts per million, of a polyfunctional polyol is added to prepolymer prepared according to any desired method and the mixture then charged directly into the mixing stages of a conventional extrusion apparatus and brought to melt form with no separate preliminary heating period in a prepolymer reaction vessel to bring the prepolymer to product inherent viscosity. During the dwell time in the extruder, it has been found necessary in order to achieve the desirable results of the instant invention that the prepolymer be stirred or otherwise agitated in one fashion or another so that from about 15 to about 150 ft.-lbs./sec. per pound of prepolymer of mechanical energy be imparted to the mixture. The exact effect caused by such treatment or the reasons why it is necessary are not clear at this time, however, apparently the overall total reaction may be defined as a mechano-chemical reaction whose overall kinetics are controlled to some degree by the amount of *mechanical* energy imparted to the system. This may be due for example to the fact that increased input of mechanical energy in the form of stirring provides shearing of the polyester molecule to provide an increased number of free radicals suitable for attack by the polyol or merely because the input of such controlled amounts of mechanical energy in the form of stirring provides an increase in the number of encounters between polyester free radicals and polyol so that the cross-linking occurs more rapidly and with the desired result. Whatever the reason for the production of the desirable result, the application of the aforementioned 15–150 ft.-lbs./sec. per pound of polyester prepolymer and preferably from about 20 to about 100 ft.-lbs./sec. per pound of prepolymer of mechanical energy forms a critical aspect of the invention which must be applied concurrently with the addition of the polyol to achieve the successful practice of the present invention which permits concurrent attainment of polymer inherent viscosity and extrusion within conventional extrusion parameters of time and temperature without any additional expenditure of time or capital for a separate step. Furthermore, in order to produce a useful result it is necessary to impart the mechanical energy described above to the molten prepolymer in the extruder for a period of time sufficient to achieve an inherent viscosity increase of at least about 0.1, a period which generally amounts to between about 20 and about 150 minutes. Generally, as will be shown graphically hereinafter the required amount of mechanical energy is imparted to the melt by stirring with conventional stirring apparatus at a rate of from about 25 to about 150 r.p.m. and preferably between about 45 and about 135 r.p.m.

FIG. I shows the results of tests performed using a heated Brabender Plasti-Corder to simulate conventional extrusion conditions as they occur in the extrusion apparatus. The results indicated by curves A and B, were achieved by adding to prepolymer prepared using the aforementioned well known synthesizing techniques, as described above, 5,000 p.p.m. of pentaerythritol just before pouring the prepolymer into the Brabender apparatus. In each case the temperature was maintained constant at 273° C. and the melt covered with an $N_2$ blanket during melt mixing. In the case of curve A, a mixing speed of 45 r.p.m. was used and in the case of curve B 135 r.p.m. mixing speed. Curve C represents a check of PET prepolymer prepared under conditions identical to those used to prepare the materials of curves A and B, however, without the addition of any polyfunctional polyol, but with stirring at a rate of 45 r.p.m.

As is clear from the results shown in FIG. I, the melt viscosity, as well as the inherent viscosity of samples A and B increased rapidly during periods of 90 and 120 minutes respectively, while sample C, to which no polyfunctional polyol had been added, demonstrated no observable increase in melt viscosity, and consequently, inherent viscosity after a period of 180 minutes.

It is also clear that increased mixing speed which is indicative of increased mechanical energy input, as shown more specifically in the examples below, increased the rate of climb of inherent viscosity (as well as melt viscosity) of the prepolymer material significantly.

Within certain broad limits, the particular polyfunctional polyol utilized to achieve the goals of the present invention apparently has little effect upon the successful practice of the invention, so long as the material used does not produce steric hindrance or any other such phenomena which might impede the primary aim of the overall reaction, namely, polymerization of the PET to produce useful sheet or other extruded material.

Among the polyols suitable for use in accordance with the method of the present invention are, among others; compounds having the general formula: $R(OH)_n$ wherein R is a polyvalent aliphatic radical such as an alkyl group containing from 2 to 6 carbon atoms, and $n$ is an integer from 3 to 6, for example glycerol or sorbitol and the like; compounds having the general formula:

$$R(CH_2OH)_n$$

wherein R is a polyvalent aliphatic radical containing from 1 to 6 carbon atoms and $n$ is an integer from 3 to 6, for example, pentaerythritol, trimethylol ethane, trimethylol propane and the like compounds; and generally any polyfunctional polyol which can act as a chain extender or cross-linked agent to substantially reduce prepolymer and powder polymerization times without adversely affecting the tensile or other physical properties of the finished sheet.

Heating in the extruder should be within conventional limits applied to polyester materials at this stage of their preparation. In the case of PET, there would generally be required and provided a heating temperature of from about 260° C. to about 290° C. which would be applied in an inert atmosphere for a period of from about 20 minutes to about 3 hours.

A comparison of the polymer reaction times required in the case of PET sample to which 5,000 p.p.m. of pentaerythritol were added to prepolymer having an initial I.V. of about 0.4 (a material similar to those used to obtain the curves A and B in FIG. I) and a sample of unmodified PET identical to that used to obtain curve C in the figure is shown in Table I. Both samples were prepared according to conventional techniques using a zinc catalyst up to the point of prepolymer formation.

TABLE I.—POLYMER REACTION TIMES

| | Modified PET | Unmodified PET |
|---|---|---|
| Resin | PET, 2 moles | PET, 2 moles. |
| Catalyst | $1 \times Zn(OAc)_2 \cdot 2H_2O$ | $1 \times Zn(OAc)_2 \cdot 2H_2O$. |
| Pentaerythritol, p.p.m. | 5,000 added at the end of the prepolymer. | None. |
| Prepolymer, I.V. | 0.43 | 0.45. |
| Total time to product I.V. sec. | 15,790 | 19,920. |
| Product I.V. | 0.58 | 0.59. |

The effect of the addition of the 5,000 p.p.m. of pentaerythritol at this point is clearly evident, as it required the unmodified PET about 4200 seconds, or about 70 minutes, longer to achieve product I.V. than were required by the modified PET sample.

Comparison of the mechanical energy input provided in each of the systems was also measured and compared. In the conventional preparation of PET sheeting such as that tested as the check material in Table II, at the end of the prepolymer formation step, the reaction requires about 25 HP or 13,750 ft. lbs./sec. to mix a standard 9100 lb. charge of the material at 125 r.p.m., which is an average power input of $$13{,}750 \text{ ft. lbs./sec.} \times \frac{1}{9100}$$

or 1.5 ft. lbs./sec.

Similar calculation of the mechanical energy input required to perform the preferred improved process of the present invention as calculated from the results obtained using a Brabender mixer are as follows:

1 meter gram = $7.23 \times 10^{-3}$ ft. lbs. Using a sample charge of 50.0 grams.

$\tau$ torque (meter grams) $\times$ r.p.m.

$$= \frac{7.23 \times 10^{-3} \text{ ft. lbs.}}{1 \text{ meter gram}} \times \frac{2\pi \text{ rad}}{\text{rev.}} \times \frac{1 \text{ min.}}{60 \text{ sec.}}$$

$$= \tau \text{ (speed) } (7.58 \times 10^{-4})$$

$$= \text{total power input (ft. lbs./sec.)}$$

Therefore:
For 50.0 grams of material $$(\tau) \text{ (speed) } (7.58 \times 10^{-4}) \left(\frac{1}{50} \text{ g.}\right) \left(\frac{454 \text{ g.}}{1 \text{ lb.}}\right)$$

$$= \frac{\text{Power in}}{\text{Pound of Mat}}$$

Table II shows a comparison between the physical properties of sheets formed of the two types of PET, i.e. the modified and the unmodified PET.

TABLE II.—POLY(ETHYLENE TEREPHTHALATE) TENSILE PROPERTIES

| Properties | PET (check) | | PET 5,000 p.p.m. pentaerythritol | |
|---|---|---|---|---|
| | Length | Width | Length | Width |
| Yield strength, $10^3$ p.s.i. | 14.1 | 15.8 | 13.8 | 17.8 |
| Yield elongation, percent | 4.9 | 4.4 | 5.1 | 4.4 |
| Break strength, $10^3$ p.s.i. | 24.3 | 30.5 | 19.8 | 33.3 |
| Break elongation, percent | 125 | 92 | 140 | 69 |
| Young's modulus, $10^5$ p.s.i. | 4.8 | 6.7 | 4.6 | 7.5 |
| Tensile heat distortion: | | | | |
| (a) ° C. at 2% shrink | 202 | 184 | 206 | 198 |
| (b) Max percent shrink | 8.3 | 6.2 | 6.0 | 4.6 |
| (c) ° C. at 2% stretch shrink—1 hour at 150° C. | 250 | 244 | 256 | 244 |

As is clear from a study of these results, addition of the polyol, in this case 5,000 p.p.m. of pentaerythritol; has little effect if any on the majority of physical properties of the finished sheet, and in some cases, notably shrinkage, the sheet made from the modified material actually exhibits superior properties in the form of improved resistance to shrinkage.

FIG. II demonstrates the effects achieved when varying amounts of the polyol are added to the prepolymer and the rate of stirirng remains constant. Curve A again demonstrates the results obtained when 5,000 p.p.m. of pentaerythritol were added to the prepolymer under extrusion conditions (273° C.) and the mixture stirred at a rate of 45 r.p.m. Curve E demonstrates the altered effect achieved when 10,000 p.p.m. of the polyol were added and curve F the result achieved with the addition of 15,000 p.p.m. of the polyol. As is clear from these curves, product inherent viscosity is achieved approximately three times faster when either of the two higher concentrations of polyol are used, however, as is similarly clear no significant increase in the speed of attainment of the desired inherent viscosity is achieved by using the higher concentrations of polyol. It is therefore preferred, to maintain the optimum physical properties of the polyester to add at most about 10,000 p.p.m. of the polyol even though additions of 15,000 and apparently even up to about 20,000 p.p.m. can be made to achieve attainment of product inherent viscosity in the extruder without drastically and/or adversely affecting the properties of films and/or objects extruded with the treated polyester.

The stirring of the prepolymer-polyol mixture in the extruder may be performed for any period suitable to produce any desired increase in inherent viscosity which may be required for the particular product being fabricated. This period will of course vary a great deal depending upon the amount of polyol added, the stirring rate within the prescribed range and the initial I.V. of the starting material, however, it will generally be required that stirring be performed for a period of from about 30 minutes up to about 140 minutes, the minimum amount of time generally being selected as that period required to raise the inherent viscosity of the prepolymer to a level of about 0.5 or to raise the I.V. of the material about 0.1. All periods within these limits represent reasonable, if not strictly conventional, dwell times in the extrusion apparatus.

No extensive mention has been made of the effect achieved if the polyol is added without stirring since evaluation of such materials has indicated that addition without stirring or the imparting of the required amount of mechanical energy in one fashion or another, although it produces some slight increase in I.V. provides a material which is of a highly nonuniform character whose properties from sample to sample vary greatly and to such a degree as to provide a material which has not only a varying I.V. but also greatly differing physical properties. It therefore appears that in order to achieve the highly improved and economical processing techniques described herein, both stirring and the addition of the polyol are required and critical.

Thus, there has been disclosed a novel method for the preparation of extruded poly(ethylene terephthalate) and other polyester materials, which method eliminates the previously required separate and distinct polymerization of the prepolymer to product inherent viscosity prior to extrusion, and provides for the addition of a polyfunctional polyol to the prepolymer with the concurrent imparting of increased amounts of mechanical energy to hasten achievement of product inherent viscosity in the prepolymer to permit the attainment of same in the extrusion process while the melt charge awaits actual manipulation in the extruder.

The invention has been described in detail with particular reference to preferred embodiments thereof, however, it should be understood that variations and modifications thereof can be made within the spirit and scope of the invention.

I claim:

1. In a process for polymerizing and extruding polyester products comprising the steps of:
   (a) in a separate prepolymer build-up step performed in a separate apparatus, a polymerizing prepolymer to a polymer having a product inherent viscosity above about 0.7; and
   (b) extruding the polymer to finished form; the improvement which comprises eliminating the separate, polymer build-up step, in a separate apparatus by, in the mixing phase of an extrusion apparatus charged with prepolymer (I) introducing a polyfunctional polyol cross-linking agent in the prepolymer and (II) providing a mechanical energy input of from about 15 to about 150 ft.–lbs./sec. per pound of the prepolymer of mechanical energy for a period sufficient to increase the inherent viscosity of the prepolymer at least about 0.1 thereby permitting polymer extrusion and attainment of product inherent viscosity in a single and continuous extrusion step.

2. The method of claim 1 wherein from about 2,000 to about 20,000 p.p.m. of said polyol are added.

3. The method of claim 2 wherein said polyester is poly(ethylene terephthalate), and from about 4500 to about 10,000 p.p.m. of said polyol are added.

4. The method of claim 2 wherein said polyfunctional polyol is selected from the group consisting of:
   (a) compounds having the general formula $R(OH)_n$ wherein R is a polyvalent aliphatic radical such as an alkyl group containing from 2 to 6 carbon atoms and $n$ is an integer from 3 to 6; and
   (b) compounds having the general formula $$R(CH_2OH)_n$$

wherein R is a polyvalent aliphatic radical containing from 1 to 6 carbon atoms and $n$ is an integer from 3 to 6.

5. The method of claim 4 wherein said polyfunctional polyol is selected from the group consisting of pentaerythritol, glycerol, sorbitol, trimethylol ethane and trimethylol propane.

6. The process of claim 3 wherein said prepolymer of step (b) is maintained in said extruder for a period of from about 20 minutes up to about 3 hours under an inert atmosphere and at a temperature of from about 260° C. to about 290° C. while being subjected to the application of from about 20 to about 100 ft.-lbs./sec. per pound of prepolymer of mechanical energy in the form of stirring.

References Cited

UNITED STATES PATENTS

| | | | |
|---|---|---|---|
| 2,895,946 | 7/1959 | Huffman | 260—75 |
| 3,251,809 | 5/1966 | Lockwood et al. | 260—75 |
| 3,438,942 | 4/1969 | Scheller | 260—75 |
| 3,480,586 | 11/1969 | Forster et al. | 260—47 |

FOREIGN PATENTS

| | | |
|---|---|---|
| 1,027,613 | 4/1966 | Great Britain. |

MELVIN GOLDSTEIN, Primary Examiner

U.S. Cl. X.R.

264—176 R, Dig. 59